Jan. 6, 1942.                W. J. MORRILL                2,269,160
                           DYNAMOELECTRIC MACHINE
                            Filed Dec. 15, 1939
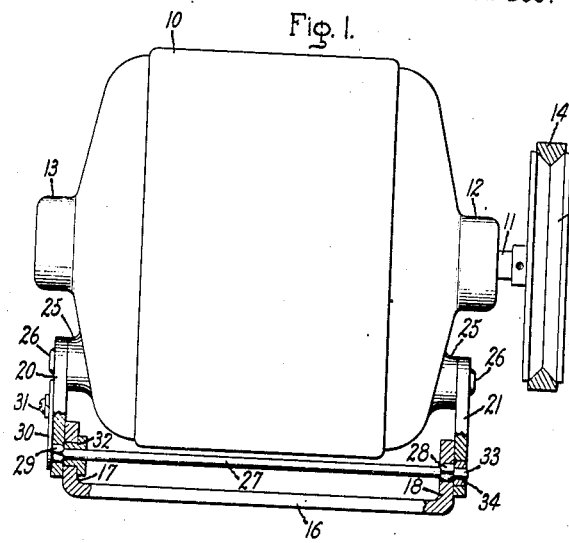
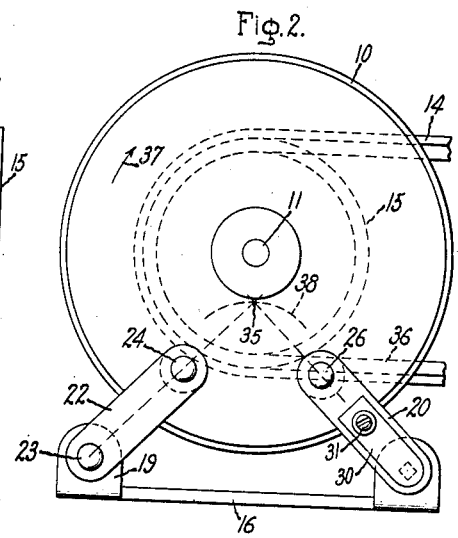
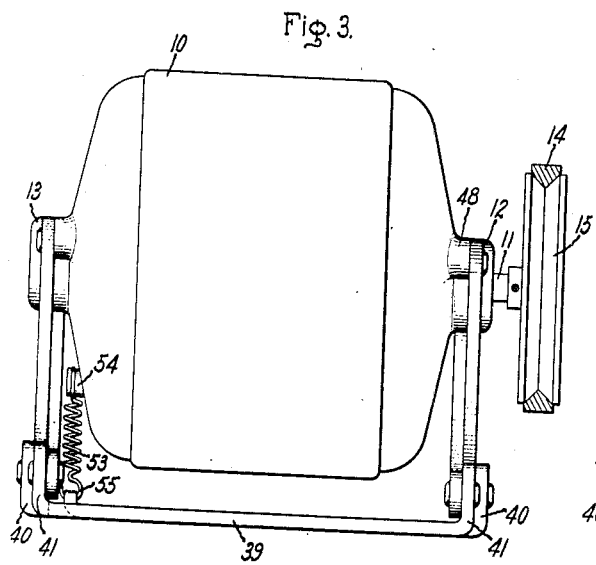
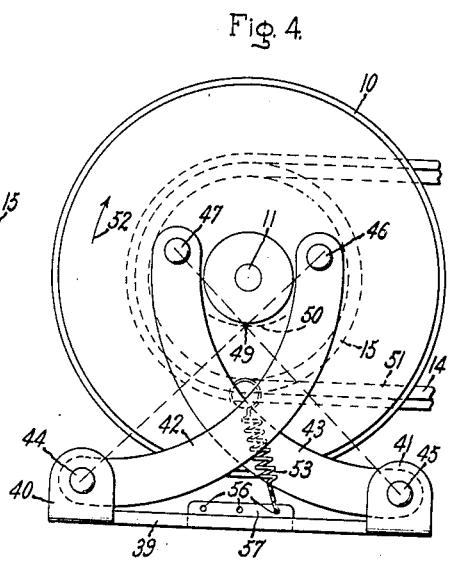
Inventor:
Wayne J. Morrill,
by Harry E. Dunham
His Attorney.

Patented Jan. 6, 1942

2,269,160

UNITED STATES PATENT OFFICE 2,269,160

DYNAMOELECTRIC MACHINE

Wayne J. Morrill, Fort Wayne, Ind., assignor to General Electric Company, a corporation of New York Application December 15, 1939, Serial No. 309,427

7 Claims. (Cl. 248—23)

My invention relates to dynamo-electric machines, and more particularly to mountings for such machines.

An object of my invention is to provide a dynamo-electric machine or the like with a frictional driving connection having an improved arrangement for regulating the friction in the driving connection.

Another object of my invention is to provide an improved mounting base for a dynamo-electric machine or the like.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevation of a dynamo-electric machine provided with a mounting, partly in section, embodying my invention; Fig. 2 is an end view of the support and machine shown in Fig. 1 viewed from the end opposite the pulley; Fig. 3 is a side elevation of a dynamo-electric machine showing another embodiment of my invention; and Fig. 4 is an end view of the machine shown in Fig. 3.

Referring to the drawing, I have shown a dynamo-electric machine having a stationary member 10 and a rotatable member mounted therein on a shaft 11, the ends of which are journaled in axially extending projections or hubs 12 and 13, formed on the stationary member. Power is transmitted from the dynamo-electric machine to a driven machine through a flexible frictional driving connection comprising a V-belt 14 which engages a V-groove pulley 15 mounted on the shaft 11.

In order to provide the desired starting and running friction in the driving connection, the stationary member 10 of the dynamo-electric machine is supported so as to move pivotally about an axis within the belt loop between the tight side of the belt and the axial center line or rotational axis of the rotatable member and the shaft 11. This stationary member pivotal axis is shiftable in accordance with the load on the machine, so that the belt tension will vary in accordance with the load transmitted thereby.

In the arrangement shown in Figs. 1 and 2, the stationary member is supported upon a mounting base 16. This base is provided with upwardly extending projections 17, 18, and 19 to which motor supporting arms 20, 21, and 22 are pivotally connected. The supporting arms 22 are the same at each end of the motor on one side of the mounting base 16, and are pivotally secured to the projections 19 on this side of the mounting base by pivot pins 23. The arms 20 and 21 on the other side of the base are pivotally secured thereto by a biasing device, and all of the supporting arms are pivotally secured to the stationary member of the dynamo-electric machine at spaced apart points on each end thereof. Pivot pins 24 provide these pivotal connections between the arms 22 and bosses 25 and pivot pins 26 pivotally secure the supporting arms 20 and 21 to other bosses 25 formed on the stationary member of the dynamo-electric machine. In order to provide the desired starting friction between the V-groove pulley 15 and the belt 14, the stationary member of the dynamo-electric machine is biased into the belt loop by an initial biasing arrangement which includes a torque spring rod 27 provided with a square head 28 arranged in engagement with a corresponding square opening formed in the base projection 18 to prevent the turning of the rod 27 with respect to the base 16. The other end of the rod 27 is provided with a square head 29 arranged in engagement with a complementary square opening formed in an end of the supporting arm 20 to prevent the rotation of the spring rod 27 with respect to this arm 20. A closure plate 30 is arranged over the opening in the end of the supporting arm 20 and is secured thereto by a screw 31 in order to prevent the axial displacement of the rod 27 with respect to the supporting arm 20. This supporting arm 20 is pivotally supported upon the projection 17 by a bushing 32 in an opening formed in the projection 17. By adjusting the relative position of the square head 29 with respect to the supporting arm 20, the torsion of the rod 27 may be adjusted to provide a corresponding adjustment in the biasing force which tends to pivot the stationary member of the dynamo-electric machine in a direction into the belt loop. The end of the rod 27 adjacent the square head 28 is formed with a cylindrical extension 33 upon which is arranged a bushing 34 which pivotally engages an opening in the lower end of a supporting arm 21, so as to support pivotally this arm upon the mounting base projection 18. In this manner, the dynamo-electric machine is pivotally supported by a pair of supporting arms which are pivotally mounted on the supporting base 16 at each end thereof. These arms also are pivotally secured to the stationary member at spaced apart points to provide a pivotal axis about which the stationary member pivots which is determined by the intersection of lines passing through the pivotal centers of the arms arranged on each end of the machine. These arms are arranged so that this pivotal axis, indicated at 35 in Fig. 2, is eccentric with respect to the rotational axis of the rotatable member and the shaft 11 and substantially parallel thereto and is between the rotational axis of the rotatable member and the tight side 36 of the belt when the machine rotates in the direction indicated by the arrow 37. Furthermore, it will be seen that pivoting of the stationary member into the belt loop will shift the relative arrangement of the supporting arms so that the point of intersection of lines passing through the pivotal connections to the mounting base and to the stationary member shifts, as indicated by the dotted line 38 in Fig. 2. This shifting of the pivotal axis is arranged so that the tightening of the belt varies in accordance with the variation of the load transmitted thereby, and may be adjusted for different machines and different sizes of pulleys by adjusting the relative arrangement of the pivotal connections of the supporting arms to the stationary member of the dynamo-electric machine and to the mounting base.

In Figs. 3 and 4, I have shown another embodiment of my invention wherein the stationary member 10 of a dynamo-electric machine also is provided with a rotatable member mounted on a shaft 11, the ends of which are journaled in axially extending projections or hubs 12 and 13 formed on the stationary member. Power is transmitted from the dynamo-electric machine to a driven machine through a flexible frictional driving connection comprising a V-belt 14 which engages a V-groove pulley 15 mounted on the shaft 11. As in the arrangement shown in Figs. 1 and 2, the dynamo-electric machine is supported upon a mounting base 39 provided with upwardly extending projections 40 and 41 arranged on the two sides of the base. A pair of upwardly extending crossed supporting arms 42 and 43 is pivotally secured by pivot pins 44 and 45, respectively, to the projections 40 and 41 formed on the base 39 and by pivot pins 46 and 47 to bosses 48 formed on the stationary member of the dynamo-electric machine. The pivot pins 46 and 47 are spaced apart so that lines passing through the centers of the pivot pins 44 and 46, and 45 and 47 intersect along a line 49, forming an axis eccentric with respect to the rotational axis of the rotatable member and shaft 11 and substantially parallel thereto. The arrangement of the pivotal connections of the arms 42 and 43 to the mounting base 39 and the stationary member of the dynamo-electric machine is such that the pivotal axis 49 is shiftable, as indicated by the dotted line 50 in Fig. 4, to provide for tightening of the belt 14 in accordance with the load transmitted thereby, and remains between the axis of the shaft 11 and the tight side 51 of the belt 14 when the machine rotates in the direction indicated by the arrow 52. In order to provide the desired starting friction in the driving connection between the belt 14 and the pulley 15, the stationary member of the dynamo-electric machine is initially biased into the loop of the belt 14 by a resilient coil spring 53. This spring is secured to the stationary member 10 by a pin 54 and to the mounting base 39 by the hooked end 55 thereof, which is secured in an opening 56 in an upwardly extending projection 57 formed on an end of the mounting base 39 intermediate the upwardly extending supporting projections 40 and 41. The initial bias of the stationary member can be adjusted by securing the hooked end 55 of the spring 53 in any one of three openings 56 in the projection 57 to provide adjustment for different types of loads and for different rotations of the machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine or the like having a stationary member and a rotatable member, a pair of supporting arms adapted to be pivotally secured to a support, means for pivotally securing the other ends of said supporting arms to said stationary member so as to mount said stationary member pivotally about an axis substantially parallel to the axis of said rotatable member and eccentric with respect thereto, and means for pivotally supporting the other end of said stationary member.

2. A dynamo-electric machine or the like having a stationary member and a rotatable member, a mounting base, crossed supporting arms pivotally secured at one end thereof to said mounting base, and means for pivotally securing the other ends of said supporting arms at spaced apart points to said stationary member to mount said stationary member on said mounting base pivotally about an axis substantially parallel to the axis of said rotatable member and eccentric with respect thereto.

3. A mounting base for a dynamo-electric machine or the like having a stationary member including supporting arms pivotally secured at one end thereof to said mounting base, and means for pivotally securing the other ends of said supporting arms at spaced apart points to said stationary member to mount the stationary member on said mounting base pivotally about an axis substantially parallel to the axis of said rotatable member and eccentric with respect thereto.

4. A mounting base for a dynamo-electric machine or the like having a stationary member including supporting arms pivotally secured to said mounting base, means for pivotally securing said supporting arms to said stationary member to mount said stationary member on said mounting base pivotally about an axis substantially parallel to the axis of said rotatable member and eccentric with respect thereto, and means for initially biasing said dynamo-electric machine in a predetermined direction with respect to said mounting base.

5. A mounting base for a dynamo-electric machine or the like having a stationary member including supporting arms pivotally secured to said mounting base, means for pivotally securing said supporting arms to said stationary member to mount said stationary member on said mounting base pivotally about an axis substantially parallel to the axis of said rotatable member and eccentric with respect thereto, and means including a resilient element connected to one of said supporting arms for initially biasing said dynamo-electric machine in a predetermined direction with respect to said mounting base.

6. A mounting base for a dynamo-electric machine or the like having a stationary member including supporting arms pivotally secured to said mounting base, means for pivotally securing said supporting arms to said stationary member to mount said stationary member on said mounting base pivotally about an axis substantially parallel to the axis of said rotatable member and eccentric with respect thereto, and means including a torque spring rod connected to one of said supporting arms for initially biasing said dynamo-electric machine in a predetermined direction with respect to said mounting base.

7. A dynamo-electric machine or the like having a stationary member and a rotatable member provided with a frictional driving connection adapted to exert a displacing force on said machine, a support, means utilizing said displacing force for varying the driving friction in said driving connection, said means including a pair of upwardly extending crossed supporting arms pivotally secured to said support, and means for pivotally securing the other ends of said supporting arms to said stationary member to mount pivotally said stationary member eccentrically with respect to the rotational axis of said rotatable member about an axis shiftable in accordance with the load on said machine.

WAYNE J. MORRILL.